United States Patent [19]

Iwanaga et al.

[11] Patent Number: 5,309,416
[45] Date of Patent: May 3, 1994

[54] METHOD AND APPARATUS FOR INITIALIZING INTERMEDIATE REGION BETWEEN TRACKS ON MAGNETOOPTICAL RECORDING MEDIUM

[75] Inventors: Ryuichi Iwanaga; Masaharu Tsukada, both of Kawasaki, Japan

[73] Assignee: Canon Kabushiki Kaisha, Tokyo, Japan

[21] Appl. No.: 82,507

[22] Filed: Jun. 25, 1993

Related U.S. Application Data

[63] Continuation of Ser. No. 789,436, Nov. 6, 1991, abandoned, which is a continuation of Ser. No. 341,575, Apr. 21, 1989, abandoned.

[30] Foreign Application Priority Data

Apr. 26, 1988 [JP] Japan .................................. 63-101253
Apr. 27, 1988 [JP] Japan .................................. 63-102746
Jun. 29, 1988 [JP] Japan .................................. 63-159305

[51] Int. Cl.⁵ ............................................ G11B 11/00
[52] U.S. Cl. ................................... 369/13; 369/275.4; 360/114
[58] Field of Search ............... 360/114, 59; 369/13, 369/275.4, 110, 44.23, 44.24, 14, 100, 275.2, 275.3; 365/122

[56] References Cited

U.S. PATENT DOCUMENTS

| | | | |
|---|---|---|---|
| 3,876,842 | 4/1975 | Bouwhuis | 369/109 |
| 4,325,135 | 4/1982 | Dil et al. | 369/275.4 |
| 4,410,969 | 10/1983 | Maeda | 369/46 |
| 4,472,748 | 9/1984 | Kato et al. | 360/59 |
| 4,539,662 | 9/1985 | Hatano et al. | 369/13 |
| 4,703,469 | 10/1987 | Pettigrew et al. | 369/110 |
| 4,706,232 | 11/1987 | Funada et al. | 369/13 |
| 4,853,912 | 8/1989 | Akasaka et al. | 360/59 X |

FOREIGN PATENT DOCUMENTS

0252445 1/1988 European Pat. Off. .
2139784 11/1984 United Kingdom .................. 369/13

Primary Examiner—Robert J. Pascal
Assistant Examiner—Ali Neyzari
Attorney, Agent, or Firm—Fitzpatrick, Cella, Harper & Scinto

[57] ABSTRACT

A method for initializing a magnetooptical recording medium having tracks onto which information is recorded are formed in parallel and having intermediate regions among the tracks. The method includes the steps of scanning a track by a laser beam while applying a magnetic field in a predetermined direction, thereby aligning magnetizing directions of the track; and scanning the intermediate region by the laser beam while applying a magnetic field in a predetermined direction, thereby aligning the magnetizing directions of the intermediate region. An apparatus to perform such a method is also disclosed.

6 Claims, 4 Drawing Sheets

METHOD AND APPARATUS FOR INITIALIZING INTERMEDIATE REGION BETWEEN TRACKS ON MAGNETOOPTICAL RECORDING MEDIUM

This application is a continuation of prior application Ser. No. 07/789,436 filed Nov. 6, 1991, which application is a continuation of prior application Ser. No. 07/341,575 filed Apr. 21, 1989, both now abandoned.

BACKGROUND OF THE INVENTION

1. Field of the Invention

The present invention relates to a method of initializing a magnetooptical recording medium having tracks onto which information is recorded formed in parallel and having intermediate regions between the tracks, and to an apparatus for executing this method.

2. Related Background Art

Figure 1:
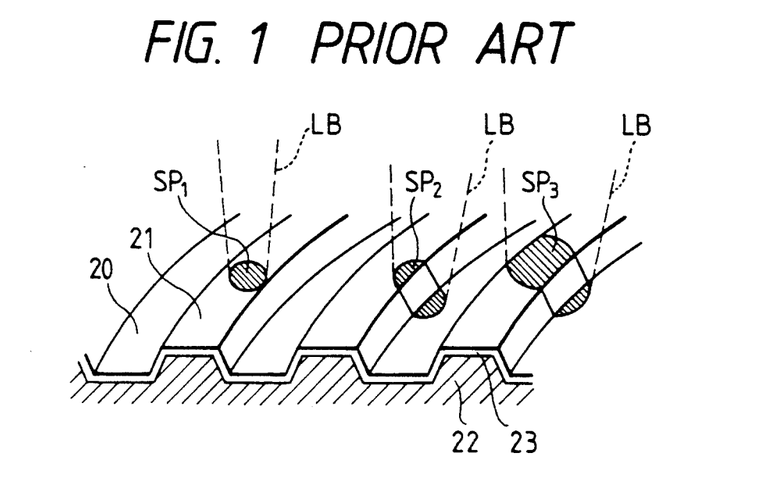
FIG. 1 is a perspective view for explaining an initializing method of a conventional magnetooptical recording medium.

Hitherto, a typical medium, which is used in a magnetooptical storing apparatus, has a construction as shown in FIG. 1.

In FIG. 1, reference numeral 22 denotes a substrate. A magnetic film 23 is formed on the surface of the substrate 22. As shown in the diagram, convex-shaped tracks (hereinafter, referred to as "lands") 21 on which information is recorded are formed on the medium. Two non-recording intermediate regions (hereinafter, referred to as "grooves") 20 are formed as concave portions (grooves) at positions adjacent to a land 21. Information is recorded by irradiating a spot-shaped laser beam LB onto a land while applying a bias magnetic field thereto.

Since the magnetizing directions of the magnetic film 23 formed upon manufacturing of the medium are random, the magnetizing directions of the magnetic layer must be once aligned into a predetermined direction and must be initialized. On the other hand, in the case of rewriting over the information recorded on the medium, it is also necessary to initialize prior to rerecording.

The initializing operation is executed in a manner such that the laser beam LB having an erasing power is irradiated onto a land 21 while applying a bias magnetic field in a direction opposite to the bias magnetic field applied upon recording, and a laser beam spot is formed and the land 21 is scanned by the beam spot. Upon scanning, automatic focusing (AF) and automatic tracking (AT) are executed so as to allow the beam spot of a proper size to be located onto the land and to always obtain a state as shown by a spot SP$_1$.

Therefore, ideally, only the magnetizing directions of the land 21 are aligned in the predetermined direction by the erasing operation.

However, actually, even if the AF and AT are executed, a case occurs wherein the laser beam is partially deviated like a spot SP$_2$ with respect to the groove 20. On the other hand, in the case of using a push-pull system a means for performing the AT, the laser beam to record, reproduce, and erase information is also used as a beam for the AT, so that the beam spot has a configuration so as to be always partially deviated like a spot SP$_3$ with respect to the groove 20.

In the cases of the spots SP$_2$ and SP$_3$ as mentioned above, the laser beam is also irradiated onto a portion of the groove 20. However, the power of the beam which is irradiated onto the groove is so small that the initializing operation to align the magnetizing directions in a predetermined direction is not substantially executed for the groove, and the random magnetizations remain.

Upon recording of information, the laser beam LB having the recording power is irradiated onto the land 21 while applying the bias magnetic field in the direction applied opposite to the direction upon initialization, a beam spot is formed, the land 21 is scanned by the beam spot, and the laser beam is turned ON and OFF in accordance with the information to be recorded. Even in the case of the recording mode, the states of the spots SP$_2$ and SP$_3$ shown in the diagram are realized, since the power of the laser beam which is irradiated onto the groove 20 is also small, similar to the case in the erasing mode, so that the recording operation is not substantially executed for the groove, and the random magnetizations remain.

The information recorded on the medium is reproduced by detecting the reflected lights from the spot. However, it is virtually impossible to form the beam spot so as not to deviate from the land 21. Therefore, the reflected lights from the medium include those lights reflected from a portion of the land 21 and those lights reflected by a portion of the groove 20.

As mentioned above, since the magnetizing directions of the groove 20 are maintained random, the signal components due to the reflected lights from the portion of the groove 20 generate noise for the normal signal due to the reflected lights from the portion of the land 21.

Consequently, the conventional magnetooptical storing apparatus has a problem such that a reproducing error rate is somewhat high.

SUMMARY OF THE INVENTION

It is an object of the present invention to solve the problems in the conventional techniques as mentioned above, and to provide a method and apparatus for initializing a magnetooptical recording medium for reducing the noises upon reproduction.

The above object of the invention is accomplished by a method of initializing a magnetooptical recording medium having tracks onto which information is recorded formed in parallel and having intermediate regions among the tracks, wherein the method includes the steps of: scanning a track by a laser beam while applying a magnetic field in a predetermined direction, thereby aligning magnetizing directions of the track; and scanning an intermediate region by the laser beam while applying a magnetic field in a predetermined direction, thereby aligning the magnetizing directions of the intermediate region.

An apparatus for executing the above initializing method includes, for instance, means for scanning the medium by a laser beam; tracking means for controlling the laser beam to trace the track; means for switching the polarity of the tracking means such that the laser beam traces the intermediate region; and means for applying a magnetic field to the medium.

As another aspect of the apparatus based on the invention, the track and the intermediate regions adjacent thereto also can be scanned by an erasing laser beam having a diameter larger than the total value of a width of a track and a width of a intermediate region.

As a further aspect of the apparatus based on the invention, an apparatus having two optical heads for respectively irradiating laser beams to a track and an intermediate region is also presented.

DETAILED DESCRIPTION OF THE PREFERRED EMBODIMENTS

Figure 2:
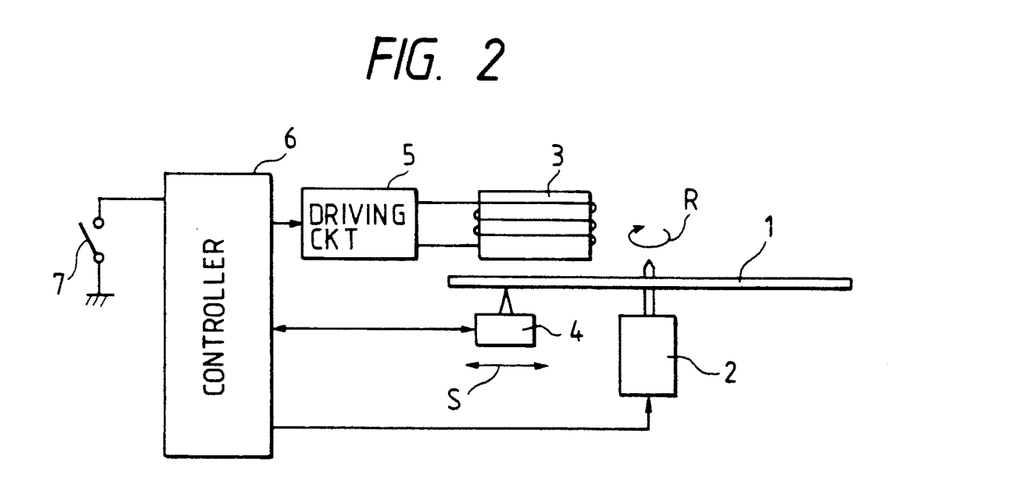
FIG. 2 is a schematic diagram showing an embodiment of a magnetooptical storing apparatus according to the present invention.

FIG. 2 is a schematic diagram showing an embodiment of a magnetooptical storing apparatus based on the present invention. Reference numeral 1 denotes an erasable magnetooptical disk which has a construction similar to that shown in FIG. 1. The disk 1 is rotated and driven in the direction indicated by an arrow (R) at a speed of 3000 r.p.m. by a spindle motor 2. Reference numeral 4 denotes an optical head which is movable in the radial directions (indicated by arrows S) of the disk 1 by a linear motor (not shown). Although not shown, a semiconductor laser, an optical system, actuators for the AF and AT, servo sensors for the AF and AT, and a photo sensor to detect a reproduction signal are arranged in the optical head 4. Reference numeral 3 denotes an electromagnet for generating a bias magnetic field to record and erase information. The bias magnetic field is uniformly applied to the recording/erasing region on the disk. Reference numeral 5 denotes a driving circuit to drive the electromagnet 3. The driving circuit 5 includes a function to change over the magnetic field direction of the electromagnet 3 in accordance with the erasing or recording operation in response to a control signal from a controller 6. Reference numeral 7 denotes a switch to indicate the groove erasure.

Figure 3:
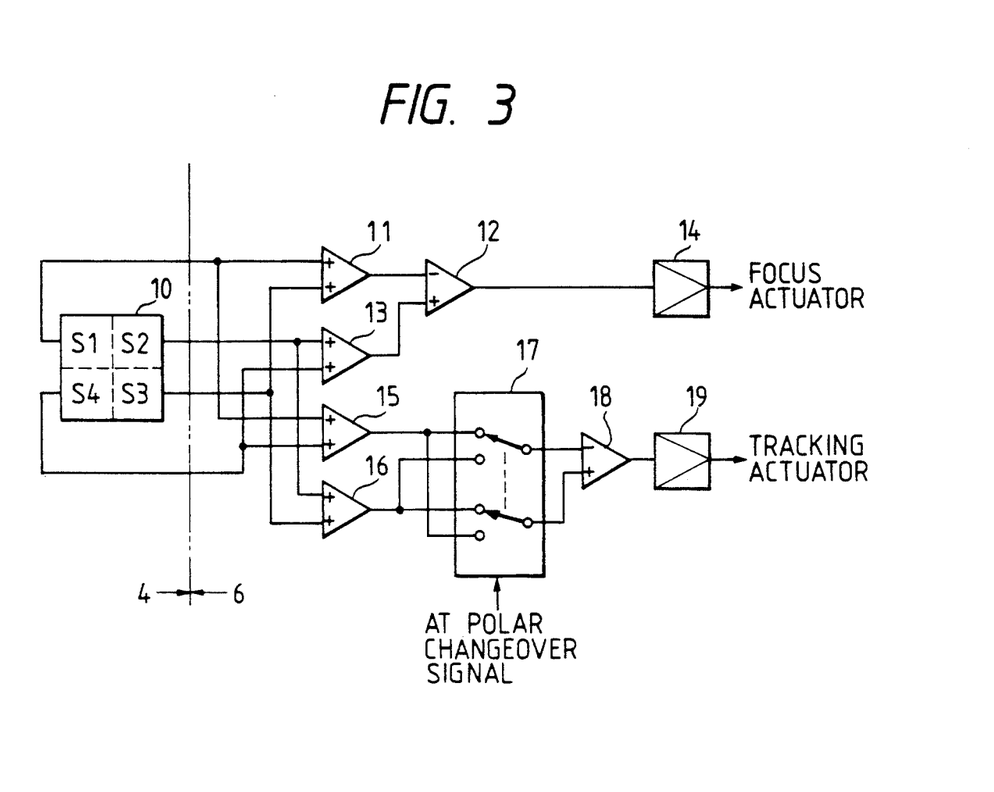
FIG. 3 is a block diagram showing focusing and tracking servo systems of the apparatus shown in FIG. 2.

FIG. 3 is a block diagram showing a focus servo system and a tracking servo system in the apparatus shown in FIG. 2. In present embodiment, an astigmatism system is used for the AF operation and a push-pull system is used for the AT operation. Such AF and AT operations have been described in detail in, for instance, U.S. Pat. No. 4,410,969 and the like.

In FIG. 3, reference numeral 10 denotes four divided sensors and their light reception amounts are indicated by $S_1$ to $S_4$. The sensors 10 are provided in the optical head 4.

The focus servo is executed in a manner such that the arithmetic operation of $(S_1+S_3)-(S_2+S_4)$ is performed by operational amplifiers 11, 12, and 13, the result of the calculation is input to a focus driving circuit 14, the phase compensation and electric power amplification are executed by the focus driving circuit 14, and the focus actuator is driven.

The tracking servo is executed by using operational amplifiers 15, 16, and 18, a change-over switch 17, and a tracking driving circuit 19. In accordance with an AT polar change-over signal which is input from the controller 6 to the change-over switch 17, in the case of land tracking, the result of the calculation of $(S_1+S_4)-(S_2+S_3)$ is input to the tracking driving circuit 19, and in the case of groove tracking, the result of the calculation of $(S_2+S_3)-(S_1+S_4)$ is input to the driving circuit 19.

The tracking driving circuit 19 executes phase compensation and power amplification and drives the tracking actuator.

Figure 4:
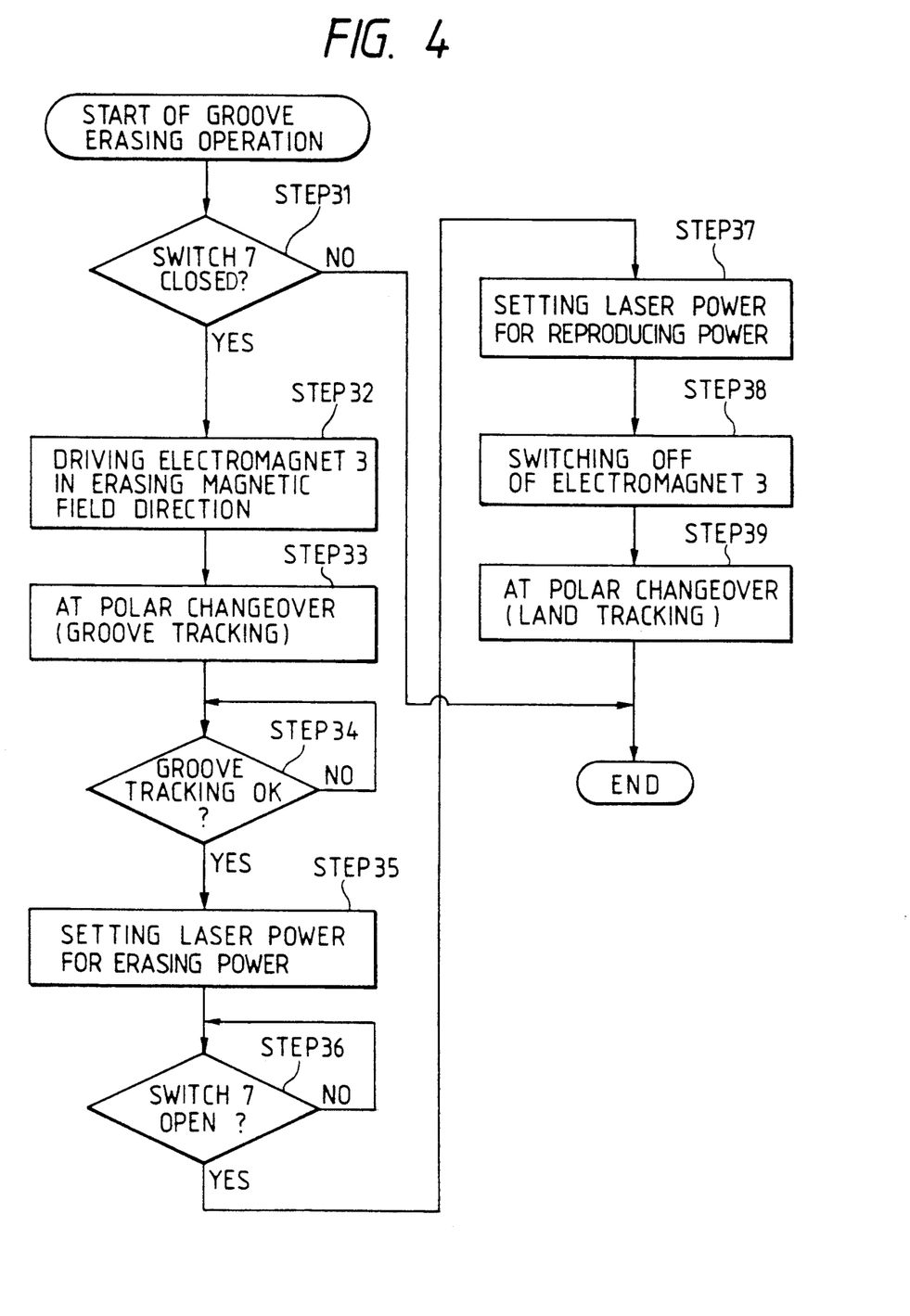
FIG. 4 is a flowchart for explaining the operation of the apparatus shown in FIG. 2.

FIG. 4 is a flowchart showing an operating sequence in the groove erasing mode in the embodiment.

The groove erasing operation will now be described hereinbelow in accordance with the flowchart of FIG. 4 with reference to FIGS. 2 and 3.

The groove erasing operation is started by closing the switch 7 from the outside. That is, the controller 6 first discriminates whether the switch 7 has been closed or not (step 31). If it is determined in step 31 that the switch 7 is open, the processing routine is finished and the erasing operation of the groove is not executed.

If it is decided in step 31 that the switch 7 has been closed, the electromagnet 3 is then driven so as to generate the erasing magnetic field (step 32). The AT polar change-over signal is sent to the change-over switch 17 in the AT servo circuit provided in the controller 6 (step 33). Thus, the laser beam spot irradiated onto the land 21 is moved to the groove 20.

A check is then made (in step 34) to see if the beam spot has correctly been moved and whether the groove tracking can be executed (OK) or not. The apparatus waits until the groove tracking becomes OK.

After the groove tracking becomes OK, the laser power is set to the erasing power (in step 35). After that, the groove erasure is executed while executing the groove tracking. The groove erasure is executed until the switch 7 is opened.

If it is decided in step 36 that the switch 7 is open, the laser power is then set to the reproducing power (in step 37). The electromagnet 3 is turned off (in step 38). The AT polar change-over signal is input to the switch 17 (in step 39). Thus, the laser beam spot is moved from the groove 20 to the land 21.

The groove erasing operation is finished in this manner.

In the embodiment, the initialization (erasure) is executed by selectively scanning the land and groove by the laser beam while switching the polarity of the tracking servo.

Figure 5:
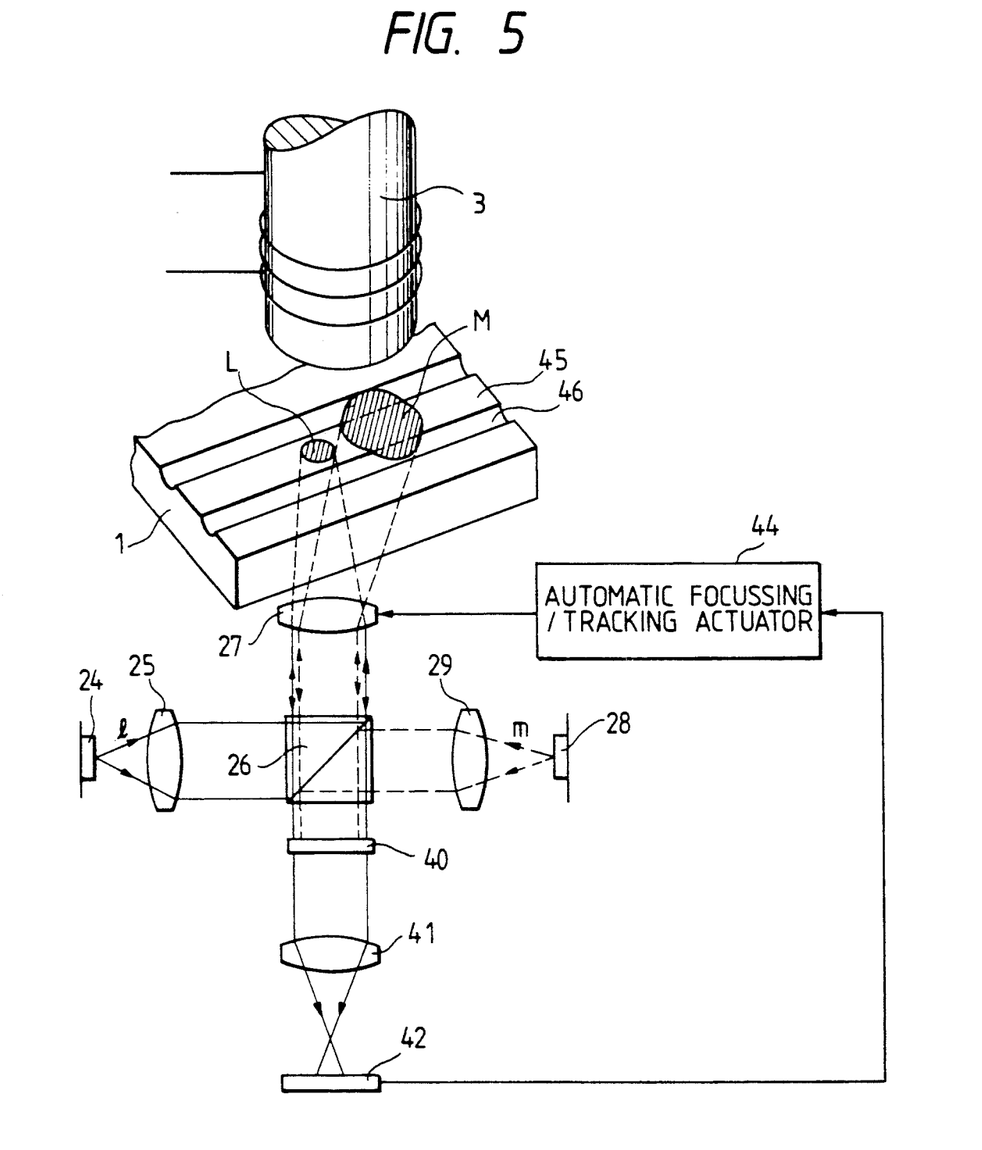
FIG. 5 is a schematic diagram showing an optical head section in another embodiment of a magnetooptical storing apparatus based on the invention.

FIG. 5 is a schematic diagram showing an optical head section in another embodiment of a magnetooptical storing apparatus based on the invention. The portions other than the optical head section are constructed in a manner similar to FIG. 2.

In FIG. 5, the electromagnet 3 to generate the erasing magnetic field is arranged over the magnetooptical disk 1 having guide grooves 46 and recording tracks 45. On the other hand, as laser beam irradiating means, there are provided: semiconductor lasers 24 and 28; condenser lenses 25 and 29; a polarizing beam splitter 26; a filter 40; convergent lenses 27 and 41; a photodetector 42; and an automatic focusing/tracking actuator 44. The convergent lens 27 is held so as to be movable in two axial directions of the directions, the optical axis and in the direction perpendicular to the tracks. The semiconductor laser 24 emits a laser beam λ having a wavelength of 830 nm. The semiconductor laser 28 emits a laser beam m having a wavelength of 780 nm.

The operation of the embodiment will now be described.

The erasing magnetic field is generated by supplying current to the coil of the electromagnet 3 and in this state, both of the semiconductor lasers 24 and 28 are energized to emit the laser beams, respectively.

The laser beam λ emitted from the semiconductor laser 24 is transmitted through the polarizing beam splitter 26 and convergent lens 27 and is focused onto the magnetooptical disk 1, thereby forming a spot L. The reflected lights from the disk 1 of the spot L (beam λ) sequentially pass through the convergent lens 27, polarizing beam splitter 26, filter 40, and convergent lens 41 and are led to the photodetector 42. The photodetector 42 comprises four divided PIN photodiodes. The photoelectric conversion is executed in each of the PIN photodiodes and the resultant electric signals are sent to the automatic focusing/tracking actuator 44. In response to the electric signals, the actuator 44 moves the convergent lens 27 in the direction of the optical axis and in the direction perpendicular to the track, thereby executing the focusing and tracking adjustments.

On the other hand, the laser beam m emitted from the semiconductor laser 28 is also transmitted through the polarizing beam splitter 26 and convergent lens 27 and a spot M having a beam diameter which is equal to or larger than the track pitch width is formed onto the disk 1 in a manner similar to the beam λ. The light spot M always irradiates the recording track 45 and the regions of at least ½ or more of the guide grooves 46 on both sides of the recording track 45. On the other hand, the reflected lights of the spot M are blocked by the filter 40 and do not reach the photodetector 42. Therefore, the focusing and tracking adjustments of the convergent lens 27 are executed on the basis of the reflected lights of the laser beam λ. However, since the beam m is focused onto the disk 1 by the convergent lens 27 in a manner similar to the beam λ, the light spots L and M are simultaneously moved by the same distance in the direction perpendicular to the track. The light spot M follows the light spot L and is accurately moved while being subjected to the focusing and tracking servo operations. Thus, the magnetizing directions of the track 45 and guide grooves 46 are uniformly aligned with the direction of the magnetic field generated by the electromagnet 3 and the initialization is executed.

With the foregoing construction, the laser power for the tracking control was set to 1 mW and the erasing power was set to 10 mW, the rotating speed of the disk was set to 1800 r.p.m., and the erasing operation was executed while applying the magnetic field by the electromagnet 3. Thus, the noise level of the reproduction signal was reduced as compared with the case of erasing by the same beam diameter as that in the case of the reproducing mode in the conventional apparatus. On the other hand, since both the recording track and the guide tracks can be erased by the single erasing operation, the initializing time can be reduced.

Figure 6:
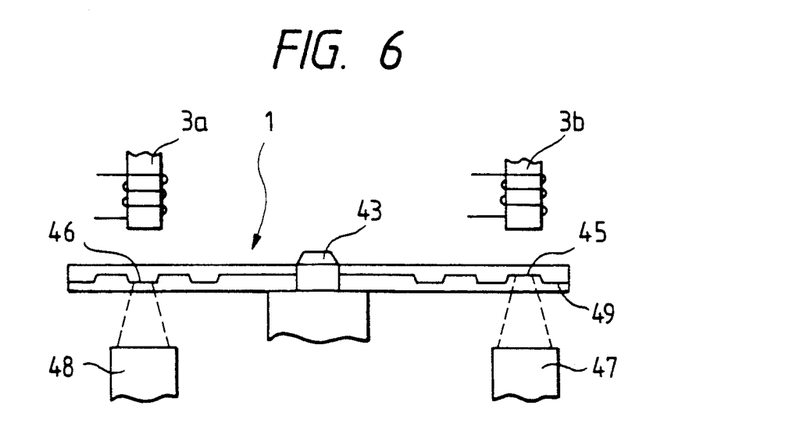
FIG. 6 is a schematic diagram showing a construction of yet another embodiment of a magnetooptical storing apparatus based on the invention.

FIG. 6 is a schematic diagram showing a construction of yet another embodiment of a magnetooptical storing apparatus based on the invention. In the diagram, the magnetooptical disk 1 is placed so as to be rotatable around a spindle 43. A magnetic layer 49 is formed on the guide grooves 46 and recording tracks 45. As means for initializing the disk 1, there are provided: electromagnets 3a and 3b; an optical head 47 to erase the recording tracks; and an optical head 48 to erase the guide grooves. The electromagnets 3a and 3b are arranged on the recording track 45 and the guide groove 46 so as to face each other in the radial direction, respectively. The optical heads 47 and 48 are arranged at positions on the side opposite to the disk 1 corresponding to the electromagnets 3a and 3b so as to have a similar positional relation.

An initializing method of the embodiment will now be described.

Magnetic fields are generated in the same direction by supplying current to the coils of the electromagnets 3a and 3b. In this state, laser beams are irradiated onto the magnetic layer 49 on the recording track 45 and guide groove 46 from the optical head 47 to erase the recording track, and from the optical head 48 to erase the guide groove. By the irradiation of the laser beams, a temperature of the magnetic layer 49 rises, so that the coercive forces in the relevant portions decrease. When the coercive forces are less than the bias magnetic, fields generated by the electromagnets 3a and 3b, the magnetizing directions are uniformly aligned to the direction of the bias magnetic fields, so that the initialization is executed. By executing such an initialization for the whole circumference of the disk 1, both the recording track 45 and the guide groove 46 can be simultaneously erased.

The invention is not limited to the foregoing embodiments, but various applications are also possible. For instance, although the recording track and the guide groove have almost simultaneously been erased in the above embodiment, it is also possible to provide an arrangement such that information of only the guide grooves (groove portion) is previously erased upon manufacturing of a medium, and information in the recording portion (land portion) is erased just before data is written.

The present invention also incorporates all of such exemplary applications without departing from the spirit and scope of the appended claims of the invention.

What is claimed is:

1. A method of initializing a magnetooptical recording medium having a plurality of information tracks onto which information is recorded and having a plurality of intermediate regions, free from having information recorded thereon, alternately arranged, said method comprising the steps of:

tracing a central portion of an information track with a coincident central portion of a light beam which is tracking-controlled to the track and has sufficient power to align a magnetizing direction, while applying to the recording medium a magnetic field having a predetermined direction, thereby aligning a magnetizing direction of the information track in a uniform direction; and tracing a central portion of an intermediate region with a coincident central portion of the light beam which is tracking-controlled to the intermediate region and has sufficient power to align a magnetizing direction while applying to the recording medium a magnetic field having a predetermined direction, thereby aligning a magnetizing direction of the intermediate region in a uniform direction.

2. An apparatus for initializing a magnetooptical recording medium having a plurality of information tracks onto which information is recorded and having a plurality of intermediate regions, free from having information recorded thereon, alternately arranged, said apparatus comprising:

means for applying to the recording medium a magnetic field having a predetermined direction;

scanning means for scanning the recording medium by a light beam having sufficient power to align a magnetizing direction;

tracking means for selectively effecting a first tracking control operation in which the light beam is tracking-controlling to an information track so as to trace the track and a second tracking control operation in which the light beam is tracking-controlled to an intermediate region so as to trace the intermediate region; and switching means for switching the tracking operation of said tracking means between the first tracking control operation and the second tracking control operation.

3. An apparatus according to claim 2, wherein said tracking means comprises:

a photodetector for receiving light reflected from the recording medium and for generating a tracking error signal; and a tracking actuator for changing a light beam irradiating position on the recording medium in accordance with the tracking error signal generated by said photodetector.

4. An apparatus according to claim 3, wherein said switching means comprises a switching circuit for inverting a plurality of the tracking error signal, and for inputting the inverted signal to said tracking actuator.

5. An apparatus for initializing a magnetooptical recording medium having a plurality of information tracks onto which information is recorded and having a plurality of intermediate regions, free from having information recorded thereon, alternately arranged, said apparatus comprising:

a magneto for applying to the recording medium a magnetic field having a predetermined direction;

an optical head for irradiating the recording medium with a light beam having sufficient power to align a magnetizing direction;

a motor for relatively moving the recording medium and the light beam;

a photodetector for receiving light reflected from the recording medium and for generating a tracking error signal;

a tracking actuator for changing an applied position of the light beam on the recording medium in accordance with the tracking error signal; and a switching circuit for switching between a first tracking operation in which the light beam is tracking-controlled to an information track so as to trace the track and a second tracking operation in which the light beam is tracking-controlled to an intermediate region so as to trace the intermediate region, by selectively reversing a polarity of the tracking error signal input to the tracking actuator.

6. A method of producing an initialized magnetooptical recording medium having a plurality of information tracks onto which information is recorded and a plurality of intermediate regions, free from having information recorded thereon, alternately arranged, said method comprising the steps of:

providing a magnetic film having a random magnetizing direction on a substrate on which a plurality of grooves are formed;

tracing a central portion of an information track, which includes a region in between the grooves, with a coincident central portion of light beam which is tracking-controlled to the track and has sufficient power to align a magnetizing direction while applying to the magnetic film, a magnetic field having a predetermined direction, thereby aligning the magnetizing direction of the magnetic film of the track in a uniform direction; and tracing a central portion of an intermediate region, which includes a groove, with a coincident central portion of the light beam which is tracking-controlled to the intermediate region and has sufficient power to align a magnetizing direction while applying a magnetic field having a predetermined direction to the magnetic film, thereby aligning the magnetizing direction of the magnetic film of the intermediate region in a uniform direction.

* * * * *

UNITED STATES PATENT AND TRADEMARK OFFICE
CERTIFICATE OF CORRECTION

PATENT NO. : 5,309,416                    Page 1 of 2
DATED      : May 3, 1994
INVENTOR(S) : RYUICHI IWANAGA, ET AL.

It is certified that error appears in the above-indentified patent and that said Letters Patent is hereby corrected as shown below:

ON THE COVER PAGE: Item [57],

IN THE ABSTRACT

Line 4, "are" should be deleted.

COLUMN 1:

Line 58, "tem" should read --tem as--.

COLUMN 4:

Line 64, "of the directions," should read --in the direction of--; and
   Line 66, "beam $\lambda$" should read --beam $\ell$--.

COLUMN 5:

Line 7, "beam $\lambda$" should read --beam $\ell$--;
   Line 12, "$\lambda$)" should read --$\ell$)--;
   Line 29, "beam $\lambda$." should read --beam $\ell$.--;
   Line 37, "beam $\lambda$." should read --beam $\ell$.--; and
   Line 39, "beam $\lambda$," should read --beam $\ell$,--.

UNITED STATES PATENT AND TRADEMARK OFFICE
CERTIFICATE OF CORRECTION

PATENT NO. : 5,309,416

DATED : May 3, 1994

INVENTOR(S) : RYUICHI IWANAGA, ET AL.

It is certified that error appears in the above-indentified patent and that said Letters Patent is hereby corrected as shown below:

COLUMN 6:

Line 19, "magnetic," should read --magnetic--.

COLUMN 7:

Line 8, "tracking-controlling" should read --tracking-controlled--; and
Line 28, "plurality" should read --polarity--.

Signed and Sealed this

First Day of November, 1994

Attest:

BRUCE LEHMAN

Attesting Officer

Commissioner of Patents and Trademarks